(12) United States Patent
Hanawa et al.

(10) Patent No.: US 10,950,365 B2
(45) Date of Patent: Mar. 16, 2021

(54) INSULATED WIRE AND WINDING

(71) Applicant: Hitachi Metals, Ltd., Tokyo (JP)

(72) Inventors: Hidehito Hanawa, Hitachi (JP); Hideyuki Kikuchi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 283 days.

(21) Appl. No.: 15/108,763

(22) PCT Filed: Sep. 5, 2014

(86) PCT No.: PCT/JP2014/073499
§ 371 (c)(1),
(2) Date: Jun. 28, 2016

(87) PCT Pub. No.: WO2016/035201
PCT Pub. Date: Mar. 10, 2016

(65) Prior Publication Data
US 2016/0329127 A1 Nov. 10, 2016

(51) Int. Cl.
*H01B 7/02* (2006.01)
*H01B 3/30* (2006.01)
*H01F 27/32* (2006.01)

(52) U.S. Cl.
CPC .......... *H01B 7/0216* (2013.01); *H01B 3/305* (2013.01); *H01B 3/306* (2013.01); *H01F 27/32* (2013.01)

(58) Field of Classification Search
CPC .......... H01B 7/02; H01B 3/305; H01B 3/306; H01B 7/0216; H01B 3/30; H01B 7/00; H01F 27/32
See application file for complete search history.

(56) References Cited

U.S. PATENT DOCUMENTS

| 8,008,830 B2 | 8/2011 | Kouda et al. |
| 8,253,296 B2 | 8/2012 | Kouda et al. |

(Continued)

FOREIGN PATENT DOCUMENTS

| JP | 2000-331539 A | 11/2000 |
| JP | 2004-204187 A | 7/2004 |

(Continued)

OTHER PUBLICATIONS

International Search Report (ISR) (PCT Form PCT/ISA/210), in PCT/JP2014/073499, dated Mar. 24, 2015.

(Continued)

*Primary Examiner* — Holly Rickman
*Assistant Examiner* — Linda N Chau
(74) *Attorney, Agent, or Firm* — McGinn I.P. Law Group PLLC.

(57) ABSTRACT

An insulated wire includes a conductor, a first insulation coating layer which is provided directly on the conductor and includes a polyamide-imide resin including dispersed inorganic fine particles, and a second insulation coating layer which is provided on the outer circumference of the first insulation coating layer and includes a polyamide-imide resin or a polyimide resin. A minimum winding multiplied diameter that does not cause a crack in the first insulation coating layer when the insulated wire is elongated by 30% by a method in compliance with JISC 3216 "5.1.1" and is wound around a winding bar is greater than 2d but smaller than 4d (where d is a conductor diameter of the insulated wire).

13 Claims, 1 Drawing Sheet

(56) References Cited

U.S. PATENT DOCUMENTS

| | | |
|---|---|---|
| 8,927,865 B2 | 1/2015 | Hanawa et al. |
| 2006/0240255 A1* | 10/2006 | Kikuchi ................ H01B 3/305 |
| | | 428/375 |
| 2010/0141078 A1 | 6/2010 | Kouda et al. |
| 2011/0048766 A1 | 3/2011 | Kikuchi et al. |
| 2011/0127067 A1 | 6/2011 | Honda et al. |
| 2012/0007462 A1 | 1/2012 | Kouda et al. |
| 2012/0247807 A1 | 10/2012 | Hanawa et al. |
| 2014/0065418 A1 | 3/2014 | Kikuchi et al. |

FOREIGN PATENT DOCUMENTS

| | | |
|---|---|---|
| JP | 2010-119295 A | 5/2010 |
| JP | 2011-068875 A | 4/2011 |
| JP | 2011-113956 A | 6/2011 |
| JP | 2012-204270 A | 10/2012 |
| JP | 2014-049397 A | 3/2014 |

OTHER PUBLICATIONS

Chinese Office Action dated Apr. 27, 2017 with a partial English translation thereof.
Notification of Transmittal of Translation of the International Preliminary Report on Patentability (PCT/IB/338) in PCT Application No. PCT/JP2014/073499 dated Mar. 16, 2017 (and English translation of Written Opinion).
Chinese Office Action dated Nov. 11, 2016 with an English translation thereof.
Chinese Office Action dated Oct. 11, 2017 in Chinese Application No. 201480072980.4 with an English translation thereof.
Japanese Office Action dated Aug. 8, 2017 in Japanese Application No. 2016-546273 with an English translation thereof.

* cited by examiner

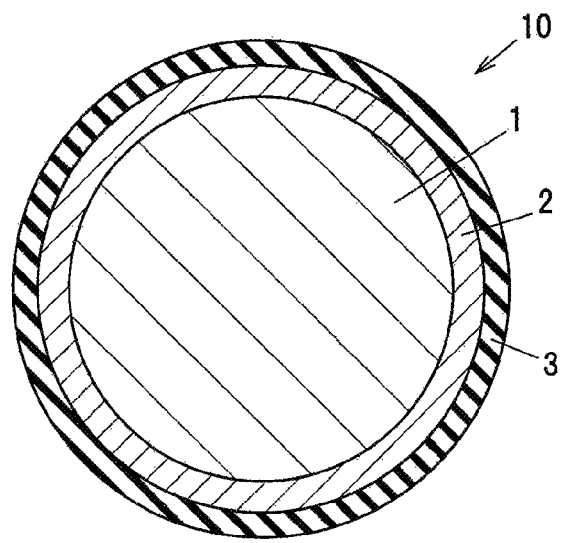

INSULATED WIRE AND WINDING

TECHNICAL FIELD

The present invention relates to an insulated wire and a winding formed using the insulated wire.

BACKGROUND ART

Inverters are used as efficient variable voltage controllers in many rotary machines. Such inverters are controlled by high-speed switching devices in a range of several kHz to several hundred kHz and high surge voltage is generated when voltage is applied.

Particularly in recent inverters, steep voltage rise is enabled by high-speed switching devices such as IGBT (Insulated-Gate Bipolar Transistor) or SiC and this causes instantaneous surge voltage of up to double the output voltage to be generated.

For example, enameled wires having an insulating film (enamel film) on a conductor are used as material to form coils of rotating machines using such inverters.

Partial discharge occurs between surfaces of coiled portions of the enameled wire due to surge voltage and causes erosion of the enamel film. The erosion of the enamel film due to partial discharge eventually causes breakdown.

To address the effect of such surge voltage, it is desirable to use, e.g., partial-discharge-resistant insulated wires (inverter-surge-resistant enameled wires) as are disclosed in PTLs 1 to 3.

Meanwhile, since motors have been downsized, coils are formed so that coil end portions are more flattened than the conventional manner. For example, PTL 4 discloses the invention which aims to reduce height of coil end portion of stator winding of rotating machine.

CITATION LIST

Patent Literature

[PTL 1]
JP-A-2000-331539
[PTL 2]
JP-A-2004-204187
[PTL 3]
JP-A-2012-204270
[PTL 4]
JP-A-2010-119295

SUMMARY OF INVENTION

Technical Problem

In recent years, motors use higher voltage than ever before due to inverter control and mostly have technical specifications such as high-speed switching, and therefore require insulation design taking into consideration partial discharge resistance. Meanwhile, windings when arranged as the coil end portions are subjected to a coil forming process such as twisting or flattening to reduce the height of the coil end portion, and large stress such as tension, abrasion or bending is thus applied to the insulating film of the enameled wire. Therefore, defects such as occurrence of cracks or wrinkles on an insulating coating or separation of the insulating film from the conductor (film separation) are likely to occur after being formed into a coil. In addition, since conductors of windings have become thicker with an increase in power output, the amount of strain applied to the windings during the coil forming process is increased and cracks or wrinkles are thus likely to occur. There is a concern that such occurrence of cracks or wrinkles on the insulating coating or film separation after being formed into a coil causes insulation properties to become lower than before being formed into a coil.

Therefore, it is an object of the invention to provide an insulated wire (enameled wire) that has an excellent partial discharge resistance even after being formed into a coil, and a winding formed of such an insulated wire.

Solution to Problem

As a result of examining how to improve flexibility and partial discharge resistance, the present inventors found that it is possible to effectively achieve the above-mentioned object by the invention described below. To achieve the above-mentioned object, the invention provides an insulated wire described below and a winding formed using such an insulated wire.

[1] An insulated wire, comprising: a conductor; a first insulation coating layer that is provided directly on the conductor and comprises a polyamide-imide resin including dispersed inorganic fine particles; and a second insulation coating layer that is provided on an outer circumference of the first insulation coating layer and comprises a polyamide-imide resin or a polyimide resin, wherein a minimum winding multiplied diameter that does not cause a crack in the first insulation coating layer when the insulated wire is elongated by 30% by a method in compliance with JIS C 3216 "5.1.1" and is wound around a winding bar is greater than 2d but smaller than 4d (where d is a conductor diameter of the insulated wire).

[2] The insulated wire defined by [1], wherein a retention rate of BVD after pressing at a press-down rate of 40% is not less than 87% of an original state (a state before pressing).

[3] The insulated wire defined by [1] or [2], wherein a retention rate of v-t characteristics (time to breakdown under measurement conditions of applied voltage of 1.0 kVrms, sine wave of 10 kHz and normal temperature) after pressing at a press-down rate of 40% is not less than 30% of an original state (a state before pressing).

[4] The insulated wire defined by any one of [1] to [3], wherein a lubricating layer comprising a polyamide-imide resin as a base resin is provided on the outer circumference of the second insulation coating layer.

[5] A wiring, comprising the insulated wire defined by any one of [1] to [4].

Advantageous Effects of Invention

According to the invention, it is possible to provide an insulated wire that has an excellent partial discharge resistance even after being formed into a coil, and a winding formed of such an insulated wire.

BRIEF DESCRIPTION OF DRAWING

FIG. 1 is a cross sectional view showing an example of an insulated wire in an embodiment of the present invention.

DESCRIPTION OF EMBODIMENT

[Insulated Wire]

FIG. 1 is a cross sectional view showing an example of an insulated wire in an embodiment of the invention.

An insulated wire 10 in the embodiment of the invention is provided with a conductor 1, a first insulation coating layer 2 provided directly on the conductor 1 and formed of a polyamide-imide resin containing dispersed inorganic fine particles, and a second insulation coating layer 3 provided on the outer circumference of the first insulation coating layer 2 and formed of a polyamide-imide resin or a polyimide resin, and the minimum winding multiplied diameter (or multiple of minimum winding diameter) that does not cause a crack in the first insulation coating layer 2 when the insulated wire is elongated by 30% by a method in compliance with JIS C 3216 "5.1.1" and is wound around a winding bar is greater than 2d but smaller than 4d (where d is a conductor diameter of the insulated wire).

The conductor 1 is formed of, e.g., a copper wire, an aluminum wire, a silver wire, a nickel wire or a nickel-plated copper wire, etc. The conductor 1 may be either a round wire or a rectangular wire.

(First Insulation Coating Layer 2)

The first insulation coating layer 2 functions as a partial-discharge-resistant layer for preventing erosion of insulating film caused by inverter surge. The first insulation coating layer 2 is formed by repeatedly applying and baking a partial-discharge-resistant insulating coating material on the surface of the conductor 1. The partial-discharge-resistant insulating coating material is obtained by dispersing organosol containing inorganic fine particles of silica, alumina, titania or zirconia, etc., into a resin coating material composed of a polyamide-imide as a base resin and a solvent.

<Composition of Organosol>

A dispersant for organosol in the embodiment of the invention is, e.g., a dispersant (main dispersant) consisting mainly of cyclic ketones having a boiling point within a range of 130° C. to 180° C.

Examples of such cyclic ketones include cycloheptanone (boiling point: 180° C.), cyclohexanone (boiling point: 156° C.) and cyclopentanone (boiling point: 131° C.), etc. It is possible to use at least one or more of these cyclic ketones. Cyclic ketones having a partially or entirely unsaturated cyclic structure, such as 2-cyclohexen-1-one, may be also used.

For the purpose of improving stability of the organosol or of the insulating coating material (partial-discharge-resistant coating material) as a mixture of organosol with a resin coating material, the dispersant may be the above-listed cyclic ketones mixed with a solvent such as N-methyl-2-pyrrolidone (NMP), N,N-dimethylformamide (DMF) or N,N-dimethylacetamide (DMAC), an aromatic hydrocarbon or lower alcohol, etc. However, affinity with a polyamide-imide resin coating material decreases with an increase in the percentage of dispersants other than cyclic ketones. Therefore, it is desirable that not less than 70% of the total dispersant in organo-silica sol be cyclic ketones.

The particle size of the inorganic fine particles in the organosol is preferably not more than 100 nm in terms of average particle size measured by the BET method so as to allow the insulating film to effectively exhibit partial discharge resistance. In view of transparency of the organosol per se and flexibility of the enameled wire, the average particle size of not more than 30 nm is more preferable.

The organosol can be obtained by, e.g., solvent replacement of a silica sol obtained by hydrolysis of alkoxysilane or solvent replacement of a silica sol obtained by ion-exchange of water-glass. However, the method of manufacturing the organosol is not limited thereto and it is possible to use any known manufacturing methods.

<Polyamide-Imide Resin Coating Material>

In view of the flexibility improving effect, components having a flexible resin structure are desirably used for the polyamide-imide resin which is a base to form the first insulation coating layer 2. The polyamide-imide resin is obtained by synthesis reaction in the solvent between mainly two components, i.e., between an isocyanate component such as 4,4'-diphenylmethane diisocyanate (MDI) and an acid component such as trimellitic anhydride (TMA).

In such a polyamide-imide resin coating material, the molecular structure units between amide bond and imide bond are relatively regularly aligned and slight crystallinity is exhibited due to hydrogen bond or π-π interaction. For example, when a biphenyl structure, etc., tending to be oriented is introduced into the molecular skeleton, solubility of resin decreases even in a NMP solvent and the resin is precipitated in some cases.

Examples of the solvent used to form the polyamide-imide resin coating material include γ-butyrolactone, N-methyl-2-pyrrolidone (NMP), N,N-dimethylformamide (DMF), N,N-dimethylacetamide (DMAC), dimethylimidazolidinone (DMI) and cyclic ketones, etc., and it is possible to use one or more of these solvents.

In view of compatibility of the organo-silica sol with the polyamide-imide resin coating material, it is preferable that cyclic ketones having a boiling point within a range of 130° C. to 180° C. be contained as the solvent in the polyamide-imide resin coating material.

Examples of the cyclic ketones used as the solvent in the polyamide-imide resin coating material include cycloheptanone (boiling point: 180° C.), cyclohexanone (boiling point: 156° C.) and cyclopentanone (boiling point: 131° C.), etc., in the same manner as that in the organo-silica sol described above. Cyclic ketones having a partially or entirely unsaturated cyclic structure, such as 2-cyclohexen-1-one, may be also used.

The method of obtaining the polyamide-imide resin coating material by dissolving a polyamide-imide resin in a solvent containing cyclic ketones is not specifically limited and may be any know method, e.g., a method in which ethanol is used to separate a resin from a polyamide-imide resin coating material synthesized in a solvent consisting mainly of NMP and only the resin component is collected and then redissolved in a solvent containing cyclic ketones, a method using direct synthesis in a solvent containing cyclic ketones, and a method in which cyclic ketones are added to a polyamide-imide resin coating material obtained by synthesis in a low-boiling-point solvent such as DMF and the solvent is exchanged through distillation.

Solubility of the polyamide-imide resin is poorer in γ-butyrolactone or cyclic ketones than in NMP, etc. Therefore, when dissolving the polyamide-imide resin in a solvent formed of γ-butyrolactone or cyclic ketones, etc., it is preferable that a polyamide-imide resin consisting mainly of 4,4'-diphenylmethane diisocyanate (MDI) and trimellitic anhydride (TMA) be used with a polyamide-imide resin containing a combination of an isocyanate other than MDI or a tricarboxylic acid other than TMA and a tetracarboxylic acid with 4,4'-MDI and TMA to disrupt the relatively regular alignment derived from the raw material of the polyamide-imide resin and thereby to reduce crystallinity.

A: Isocyanates

Examples of isocyanates, excluding 4,4'-diphenylmethane diisocyanate (MDI), which are used to disrupt the relatively regular alignment derived from the raw material of the polyamide-imide resin and thereby to reduce crystallinity, include aliphatic diisocyanates such as hexamethylene diisocyanate (HDI), isophorone diisocyanate (IPDI), dicyclohexylmethane diisocyanate (H-MDI), xylene diisocyanate (XDI) and hydrogenated XDI, or aromatic diisocyanates such as tolylene diisocyanate (TDI) and diphenylsulfone diisocyanate (SDI), etc., which are preferably used together with 4,4'-MDI. Also, such other isocyanate components may be polyfunctional isocyanates such as triphenylmethane triisocyanate, or multimeric complexes such as polymeric isocyanate and TDI, and furthermore, the compounds containing an isomer of TDI or 4,4'-MDI also exert the same effect.

Aromatic diisocyanates are desirably used so that the polyamide-imide resin obtained by synthesis reaction between 4,4'-MDI and TMA can maintain excellent properties such as heat resistance at not less than 220° C. and mechanical characteristics. Furthermore, 2,4'-MDI is used together to minimize change in the basic structure of the polyamide-imide resin and also to improve solubility and flexibility. When 2,4'-MDI is used together with 4,4'-MDI, a mixing ratio (mole ratio) of 2,4'-MDI is desirably 15 to 25 mol % of the total isocyanate components.

B: Tetracarboxylic Acids and Tricarboxylic Acids

Examples of acid components, excluding trimellitic anhydride (TMA), which are used to disrupt the relatively regular alignment derived from the raw material of the polyamide-imide resin and thereby to reduce crystallinity, include tetracarboxylic acids and tricarboxylic acids.

Examples of tetracarboxylic acids include aromatic tetracarboxylic dianhydrides such as 3,3',4,4'-diphenylsulfone tetracarboxylic dianhydride (DSDA), 3,3',4,4'-benzophenone tetracarboxylic dianhydride (BTDA) and 4,4'-oxydiphthalic dianhydride (ODPA), and alicyclic tetracarboxylic dianhydrides such as butanetetracarboxylic dianhydride and 5-(2,5-dioxotetrahydro-3-furanyl)-3-methyl-3-cyclohexene-1,2-dicarboxylic anhydride, etc.

Meanwhile, examples of tricarboxylic acids include trimesic acid and tris-(2-carboxyethyl)isocyanurate (CIC acid), etc.

The aromatic tetracarboxylic dianhydrides are desirable in view of maintaining the characteristics of the polyamide-imide resin coating material, and DSDA and BTDA are more desirable due to its good solubility. Although tetracarboxylic dianhydrides having an ester group may be used together for the purpose of providing flexibility, the amount thereof is desirably small since it causes a decrease in heat resistance or hydrolysis ability. When the tetracarboxylic dianhydrides and the tricarboxylic acids are used together with TMA, a mixing ratio (mole ratio) of the tetracarboxylic dianhydrides and/or the tricarboxylic acids is desirably 1 to 10 mol %, more desirably, 1 to 5 mol % of the total acid components.

C: Reaction Catalyst

When synthesizing the polyamide-imide resin coating material, a reaction catalyst not impairing stability of the coating material, such as amines, imidazoles and imidazolines may be used for the purpose of preventing a decrease in synthetic reactivity of the polyamide-imide resin.

(Second Insulation Coating Layer 3)

The second insulation coating layer 3 is formed by repeatedly applying and baking a general-purpose polyamide-imide resin coating material or a polyimide resin coating material on the surface of the first insulation coating layer 2.

(Lubricating Layer)

The insulated wire 10 in the present embodiment may have, if necessary, a lubricating layer which contains a polyamide-imide resin as a base resin and is provided on the outer circumference of the second insulation coating layer 3, in addition to the first insulation coating layer 2 and the second insulation coating layer 3.

The lubricating layer is a lubricating polyamide-imide overcoat layer as the outermost layer obtained by applying and baking a lubricating polyamide-imide coating material which is formed by adding a lubricant to a resin coating material formed using a polyamide-imide resin. Well-known materials/method can be used to form the lubricating polyamide-imide overcoat layer.

(Flexibility of the Insulated Wire 10)

The insulated wire 10 in the present embodiment is characterized in that the minimum winding multiplied diameter that does not cause a crack in the first insulation coating layer 2 when the insulated wire is elongated by 30% by a method in compliance with JIS C 3216 "5.1.1" and is wound around a winding bar is greater than 2d but smaller than 4d (where d is a conductor diameter of the insulated wire). Preferably, the minimum winding multiplied diameter is from 2.5d to 3.5d. In addition, the minimum winding multiplied diameter that does not cause a crack in the first insulation coating layer 2 when the insulated wire is elongated by 20% by the same method is preferably greater than 1d but smaller than 3d, more preferably, from 1.5d to 2.5d.

(Partial Discharge Resistance of the Insulated Wire 10)

The insulated wire 10 in the present embodiment is characterized in that a retention rate of BVD after pressing at a press-down rate of 40% is not less than 87% of the original state (a state before pressing).

Also, the insulated wire 10 in the present embodiment is characterized in that a retention rate of v-t characteristics (time to breakdown under the measurement conditions of applied voltage of 1.0 kVrms, sine wave of 10 kHz and normal temperature) after pressing at a press-down rate of 40% is not less than 30% of the original state (a state before pressing). Preferably, the retention rate of v-t characteristics (under the same conditions) after pressing at a press-down rate of 30% is not less than 50% of the original state, and the retention rate of v-t characteristics (under the same conditions) after pressing at a press-down rate of 20% is not less than 70% of the original state.

[Winding]

The winding in the embodiment of the invention is formed using the above-described insulated wire 10 in the embodiment of the invention.

The winding in the embodiment of the invention is suitable as a winding used to form a coil of an electrical machine such as motor.

Effects of the Embodiment of the Invention

According to the embodiment of the invention, flexibility of insulating film is improved, and also, partial discharge resistance of the insulated wire and the winding formed using the insulated wire when formed into a coil to be used in, e.g., an electrical equipment is less likely to become lower than before being formed into a coil. In addition, unlike PTL 3 (JP-A 2012-204270), an adhesive layer is not provided but the above-mentioned effects are obtained, and it is thus possible to reduce the manufacturing cost.

In addition, since the second insulation coating layer 3 provided on the outer circumference of the first insulation coating layer 2 serves as a stress relaxation layer which relaxes stress generated in the first insulation coating layer 2 when the film is stretched or bent, it is possible to obtain a winding which exhibits good partial discharge resistance even after the height of the coil end portion is reduced to smaller than the conventional manner by a coil forming process so as to be suitable for use in a downsized motor.

A further specific embodiment of the invention will be described in detail below in reference to Examples and Comparative Examples. Note that, these Examples are typical examples of the above-described embodiment and it is obvious that the invention is not limited to these Examples.

EXAMPLES

Example 1

A partial-discharge-resistant coating material obtained by mixing a highly flexible polyamide-imide resin coating material with an organo-silica sol (containing 30 phr of silica having an average particle size of φ30 nm) containing a dispersant composed of 80% of cyclohexanone and 20% of γ-butyrolactone was applied and baked on a copper wire having a conductor diameter of φ0.80 mm so as to have a thickness of 30 µm, thereby forming the first insulation coating layer 2 as a partial-discharge-resistant layer. The highly flexible polyamide-imide resin coating material used was a polyamide-imide resin coating material containing a solvent composed of 80% of γ-butyrolactone, 15% of NMP and 5% of cyclohexanone (an isocyanate component having a mixing ratio of 4,4'-MDI to 2,4'-MDI=85/15 (mol %, the same applies hereinafter) and TMA as an acid component are mixed at a mixing ratio of 50/50). Then, a resin coating material formed of a polyamide-imide resin was applied and baked on the first insulation coating layer 2 so as to have a thickness of 5 µm, thereby forming the second insulation coating layer 3. An insulated wire (enameled wire) in Example 1 was thus obtained.

Example 2

The first insulation coating layer 2 and the second insulation coating layer 3 were formed on a copper wire having a conductor diameter of φ0.80 mm in the same manner as Example 1. A lubricating polyamide-imide coating material obtained by adding a lubricant to a resin coating material formed of a polyamide-imide resin was further applied and baked on the second insulation coating layer 3 so as to have a thickness of 3 µm, thereby obtaining an insulated wire (enameled wire) in Example 2.

Comparative Example 1

It is different from the insulated wire (enameled wire) of Example 1 in a mixing ratio of the isocyanate component to the acid component in the polyamide-imide resin to be a base to form the first insulation coating layer 2. In detail, the polyamide-imide resin coating material used was a polyamide-imide resin coating material containing a solvent composed of 80% of γ-butyrolactone, 15% of NMP and 5% of cyclohexanone (an isocyanate component having a mixing ratio of 4,4'-MDI to 2,4'-MDI=90/10 and TMA as an acid component are mixed at a mixing ratio of 50/50). Apart from this difference, an insulated wire (enameled wire) in Comparative Example 1 was formed in the same manner as Example 1.

Comparative Example 2

It is different from the insulated wire (enameled wire) of Example 2 in a mixing ratio of the isocyanate component to the acid component in the polyamide-imide resin to be a base to form the first insulation coating layer 2. In detail, the polyamide-imide resin coating material used was a polyamide-imide resin coating material containing a solvent composed of 80% of γ-butyrolactone, 15% of NMP and 5% of cyclohexanone (an isocyanate component having a mixing ratio of 4,4'-MDI to 2,4'-MDI=90/10 and TMA as an acid component are mixed at a mixing ratio of 50/50). Apart from this difference, an insulated wire (enameled wire) in Comparative Example 2 was formed in the same manner as Example 2.

(Characteristic Test)

Tests of flexibility and V-t characteristics were conducted on the insulated wires in Examples and Comparative Examples under the following conditions, and these characteristics were evaluated. The results of the characteristic tests are summarized in Table 1 below.

(Method for Flexibility Test)

In the flexible test (not elongated), non-elongated insulated wires were wound around winding bars having diameters 1 to 10 times greater than the conductor diameter of the insulated wires by a method according to "JIS C 3216, 5.1.1, Winding wires", and the minimum winding multiplied diameter at which occurrence of cracks is not observed on the insulating film (the first insulation coating layer 2) by an optical microscope was measured.

In the flexible test (elongated by 20%), the insulated wires were elongated 20% by a method according to "JIS C 3216, 5.1.1, Winding wires". After that, the test was conducted by the same test method as the flexible test (not elongated) and the minimum winding multiplied diameter at which occurrence of cracks is not observed on the insulating film (the first insulation coating layer 2) by an optical microscope was measured.

In the flexible test (elongated by 30%), the insulated wires were elongated 30% by a method according to "JIS C 3216, 5.1.1, Winding wires". After that, the test was conducted by the same test method as the flexible test (not elongated) and the minimum winding multiplied diameter at which occurrence of cracks is not observed on the insulating film (the first insulation coating layer 2) by an optical microscope was measured.

The smaller the minimum winding multiplied diameter is, the more excellent the flexibility is.

(Flexibility Test Results)

As obvious from Table 1, for the insulated wires which were not elongated, the minimum winding multiplied diameter without occurrence of cracks was 1d (self-diameter) in Examples 1 and 2 as well as in Comparative Examples 1 and 2.

On the other hand, the minimum winding multiplied diameter without occurrence of cracks was 2d (twice the self-diameter) for the 20%-elongated insulated wires in Examples 1 and 2, while the minimum winding multiplied diameter without occurrence of cracks was 3d (three times the self-diameter) for the 20%-elongated insulated wires in Comparative Examples 1 and 2. This revealed that flexibility was better in Examples 1 and 2 than Comparative Examples 1 and 2.

Then, the minimum winding multiplied diameter without occurrence of cracks was 3d (three times the self-diameter) for the 30%-elongated insulated wires in Examples 1 and 2, while the minimum winding multiplied diameter without occurrence of cracks was 4d (four times the self-diameter) for the 30%-elongated insulated wires in Comparative Examples 1 and 2. This revealed that flexibility was better in Examples 1 and 2 than Comparative Examples 1 and 2.

(Test of BDV and V-t Characteristics after Pressing)

Firstly, twisted pairs were made respectively using the insulated wires (enameled wires) obtained in Examples 1 and 2 and Comparative Examples 1 and 2. Then, twisted portions of the obtained twisted pairs were flattened to simulate the state of the coil end portion after pressing. A press-down rate when flattening the twisted portions of the twisted pairs is derived from the dimensions before and after pressing and is expressed by the following equation:

Press-down rate (%)={(dimension before pressing−dimension after pressing)/dimension before pressing}×100

The BDV (Break Down Voltage) test and the V-t characteristic (applied voltage-time characteristic) test were conducted on the above-described twisted pairs.

(Method for BDV Characteristic Test)

The BDV test according to JIS C 3216, 4.4.1 was conducted on the samples of the twisted pairs made using the insulated wires in Examples 1 and 2 and Comparative Examples 1 and 2 which were pressed at respective press-down rates. The press-down rates were 20, 30 and 40%. The retention of BDV relative to the original state (before pressing) was calculated.

(BDV Characteristic Test Results)

As shown in Table 1, there was no significant difference between Examples and Comparative Examples when the press-down rate was 20% and 30%.

On the other hand, at a press-down rate of 40%, the retention rate in Example 1 was 87% which is higher than the retention rate of 75% in Comparative Example 1 having the same film structure. Meanwhile, at a press-down rate of 40%, the retention rate in Example 2 was 90% which is higher than the retention rate of 80% in Comparative Example 2 having the same film structure.

As such, the better results were obtained in Examples 1 and 2 under the harsher pressing condition.

(Method for V-t Characteristic Test)

The V-t characteristic test was conducted on the samples of the twisted pairs made using the insulated wires in Examples 1 and 2 and Comparative Examples 1 and 2 which were pressed at respective press-down rates, in the same manner as the BDV test. The press-down rates were 20, 30 and 40%. The V-t retention relative to the original state (before pressing) was calculated.

The insulated wires in the original state, the insulated wires 20% pressed, the insulated wires 30% pressed and the insulated wires 40% pressed were subjected to the V-t characteristic (withstand voltage lifetime characteristic) test and were evaluated. The V-t characteristic test was conducted at normal temperature under measurement conditions of applied voltage of 1.0 kVrms and sine wave of 10 kHz to measure time to breakdown, and the V-t retention in each pressed state, relative to the original state (before pressing), was calculated.

(V-t Characteristic Test Results)

As obvious from Table 1, in Examples 1 and 2, the V-t retention was not less than twice that in Comparative Examples 1 and 2 at each of the press-down rates of 20%, 30% and 40% and the V-t characteristics were excellent.

(Overall Evaluation of Characteristic Tests)

Based on the results of the characteristic tests in Table 1, it is understood that the insulated wires in Examples 1 and 2 are excellent in flexibility, BDV characteristics and V-t characteristics after elongation, as compared to Comparative Examples 1 and 2. This means that the insulated wires in Examples 1 and 2 can be used in, e.g., electrical equipment such as inverter motor and electrical transformer without a great decrease in partial discharge resistance even when stress is applied by a harsh coil forming process.

TABLE 1

| Test items | | Example 1 | Example 2 | Comparative Example 1 | Comparative Example 2 |
|---|---|---|---|---|---|
| Flexibility | Original state (not elongated) | 1 d | 1 d | 1 d | 1 d |
| | Elongated by 20% | 2 d | 2 d | 3 d | 3 d |
| | Elongated by 360% | 3 d | 3 d | 4 d | 4 d |
| BDV retention (%) after pressing | Original state (not elongated) | 100 | 100 | 100 | 100 |
| | Press-down rate 20% | 98 | 99 | 98 | 99 |
| | Press-down rate 30% | 97 | 98 | 94 | 96 |
| | Press-down rate 40% | 87 | 90 | 75 | 80 |
| V-t retention (h) after pressing 1.41 kVp/10 kHz/sine wave | Original state (not elongated) | 100 | 100 | 100 | 100 |
| | Press-down rate 20% | 70 | 80 | 35 | 40 |
| | Press-down rate 30% | 50 | 60 | 20 | 25 |
| | Press-down rate 40% | 30 | 40 | 10 | 15 |
| Remarks | | The results shown in Flexibility are diameters with which the samples passed the test. | | | |

The invention is not limited to the above-mentioned embodiment and examples and various modification can be implemented.

REFERENCE SIGNS LIST

10: INSULATED WIRE
1: CONDUCTOR
2: PARTIAL-DISCHARGE-RESISTANT LAYER
3: GENERAL-PURPOSE POLYAMIDE-IMIDE LAYER OR GENERAL-PURPOSE POLYIMIDE LAYER

The invention claimed is:
1. An insulated wire, comprising:
a conductor;
a first insulation coating layer that is provided directly on the conductor and comprises a polyamide-imide resin including 4,4'-diphenyl-methane diisocyanate and 2,4'-diphenyl-methane diisocyanate as isocyanate components and dispersed inorganic fine particles, the first insulation coating layer being formed from an insulating coating material comprising a mixture of a polyamide-imide resin coating material and an organosol, the polyamide-imide resin coating material including the polyamide-imide resin including the 4,4'-diphenyl-methane diisocyanate and the 2,4'-diphenyl-methane diisocyanate as the isocyanate components dissolved in a solvent including cyclic ketones having a boiling point within a range of 130° C. to 180° C., and the organosol including the inorganic fine particles dispersed in a dispersant including not less than 70% by mass of cyclic ketones having the boiling point within the range of 130° C. to 180° C.; and a second insulation coating layer that is provided directly on an outer circumference of the first insulation coating layer and comprises a polyamide-imide resin or a polyimide resin, wherein a minimum winding multiplied diameter that does not cause a crack in the first insulation coating layer when the insulated wire is elongated by 30% by a method in compliance with JIS C 3216 "5.1.1" and is wound around a winding bar is greater than 2d but smaller than 4d, where d is a conductor diameter of the insulated wire, wherein the second insulating coating layer serves as a stress relaxation layer which relaxes stress generated in the first insulation coating layer, wherein a retention rate of v-t characteristics, which is a time to breakdown under measurement conditions of applied voltage of 1.0 kVrms, sine wave of 10 kHz and normal temperature, after pressing at a press-down rate of 40% is not less than 30% of an original state, which is a state before pressing, wherein a mixing mole ratio of the 2,4'-diphenyl-methane diisocyanate in the isocyanate components is in a range from 15 mole % to 25 mol %, and wherein the dispersant of the organosol is composed of 80% of cyclohexanone and 20% of γ-butyrolactone, and, the solvent of the polyamide-imide resin coating material is composed of 80% of cyclohexanone, 15% of γ-butyrolactone, and 5% of N-methyl-2-pyrrolidone (NMP).

2. The insulated wire according to claim 1, wherein a retention rate of Break Down Voltage (BDV) after pressing at a press-down rate of 40% is not less than 87% of an original state, which is a state before pressing.

3. The insulated wire according to claim 2, wherein a lubricating layer comprising a polyamide-imide resin as a base resin is provided on an outer circumference of the second insulation coating layer.

4. The insulated wire according to claim 1, wherein a lubricating layer comprising a polyamide-imide resin as a base resin is provided on an outer circumference of the second insulation coating layer.

5. A wiring, comprising the insulated wire according to claim 1.

6. The insulated wire according to claim 1, wherein the isocyanate components has a mixing ratio of 85/15 for the 4,4'-diphenyl-methane diisocyanate to the 2,4'-diphenyl-methane diisocyanate.

7. The insulated wire according to claim 1, wherein the polyamide-imide resin of the first insulation coating layer further includes trimellitic anhydride (TMA).

8. The insulated wire according to claim 7, wherein the TMA and the isocyanate components are mixed with an equal mixing ratio.

9. The insulated wire according to claim 1, wherein the dispersed inorganic fine particles comprise one of silica, alumina, titania, and zirconia.

10. The insulated wire according to claim 1, wherein an average particle size of the dispersed inorganic fine particles is not more than 30 mm.

11. The insulated wire according to claim 1, wherein the polyamide-imide resin of the first insulation coating layer further includes one of tetracarboxylic acids and tricarboxylic acids.

12. The insulated wire according to claim 1, wherein the polyamide-imide resin of the first insulation coating layer further includes one of trimesic acid and tris-(2-carboxyethyl)isocyanurate (CIC acid).

13. The insulated wire according to claim 1, wherein the first insulation coating layer includes a lubricating polyamide-imide coating material obtained by adding a lubricant to the resin coating material formed of the polyamide-imide resin.

* * * * *